United States Patent
Gouache et al.

(10) Patent No.: US 9,660,912 B2
(45) Date of Patent: May 23, 2017

(54) CONTROL OF PACKET TRANSFER THROUGH A MULTIPATH SESSION COMPRISING A SINGLE CONGESTION WINDOW

(75) Inventors: Stephane Gouache, Cesson-Sévigné (FR); Amine Bsila, Rennes (FR); Guillaume Bichot, Cesson-Sévigné (FR)

(73) Assignee: Thomson Licensing, Issy-les-Moulineaux (FR)

( * ) Notice: Subject to any disclaimer, the term of this patent is extended or adjusted under 35 U.S.C. 154(b) by 549 days.

(21) Appl. No.: 13/579,008

(22) PCT Filed: Feb. 17, 2011

(86) PCT No.: PCT/EP2011/052377
§ 371 (c)(1),
(2), (4) Date: Aug. 14, 2012

(87) PCT Pub. No.: WO2011/101425
PCT Pub. Date: Aug. 25, 2011

(65) Prior Publication Data
US 2012/0320752 A1   Dec. 20, 2012

(30) Foreign Application Priority Data
Feb. 19, 2010  (EP) .................... 10290087

(51) Int. Cl.
*H04L 12/841* (2013.01)
*H04L 12/801* (2013.01)
(Continued)

(52) U.S. Cl.
CPC ............ *H04L 47/10* (2013.01); *H04L 45/24* (2013.01); *H04L 47/11* (2013.01); *H04L 47/125* (2013.01)

(58) Field of Classification Search
None
See application file for complete search history.

(56) References Cited

U.S. PATENT DOCUMENTS 6,295,285 B1 * 9/2001 Whitehead .................... 370/329
7,304,948 B1 * 12/2007 Ong ........................... 370/230.1
(Continued)

FOREIGN PATENT DOCUMENTS

EP          1564942        8/2005
WO     WO2009064055       5/2009

OTHER PUBLICATIONS

Search Rept:Apr. 6, 2011.
(Continued)

*Primary Examiner* — Omar Ghowrwal
*Assistant Examiner* — Angel Brockman
(74) *Attorney, Agent, or Firm* — Myers Wolin, LLC

(57) ABSTRACT

A method for controlling a packet transfer through a multipath session is disclosed. The method comprises a number of n paths linking a first endpoint to a second endpoint, n being an integer greater or equal to 2, i being an integer and 1≤i≤n; each path Pi being defined by a couple of addresses of a communication interface of the first and second endpoint; the first endpoint being configured for sending the packet to the second endpoint through anyone of the paths; the second endpoint being configured for sending an acknowledgment message through anyone of the paths when the second endpoint received a packet. According to the invention, the method involves, at the first endpoint and at a time t, steps of:
  assessing a load distribution L<i, t> through the path Pi based on evaluations of a round-trip-time RTT<i, t> over the path Pi for every i between 1 and n;
  evaluating a current available load distribution R<i, t> from the data load distribution L<i, t>, from an aggre-
(Continued)

gated size of packets D<i, t> currently assigned to be transmitted on the path Pi for every i between 1 and N, and from the aggregated size of packets D<t> currently assigned to be transmitted on any of the paths;

selecting a path Pi among the from the current available load distribution R<i, t>;

sending the packet on the selected path such that the aggregated size of packets D<i,t> to transmit through the selected path Pi is lower than a congestion window cwnd whose value is evaluated globally by the first endpoint for the multipath session.

A device for controlling a transfer of a packet through a multipath session implementing the method is further disclosed.

12 Claims, 3 Drawing Sheets

(51) Int. Cl.
*H04L 12/707* (2013.01)
*H04L 12/803* (2013.01)

(56) References Cited

U.S. PATENT DOCUMENTS

| | | | |
|---|---|---|---|
| 2003/0074388 A1* | 4/2003 | Pham et al. | 709/106 |
| 2005/0185621 A1 | 8/2005 | Sivakumar et al. | |
| 2006/0193295 A1* | 8/2006 | White et al. | 370/336 |
| 2007/0008884 A1* | 1/2007 | Tang | H04L 29/06 370/230 |
| 2007/0230352 A1 | 10/2007 | Kokku et al. | |
| 2008/0049630 A1* | 2/2008 | Kozisek et al. | 370/250 |
| 2008/0089250 A1* | 4/2008 | Jung | 370/276 |
| 2008/0184224 A1* | 7/2008 | Das et al. | 718/1 |
| 2009/0190482 A1 | 7/2009 | Blair | |

OTHER PUBLICATIONS

Casetti et al., "Westwood SCTP: load balancing over multipaths", 2004 IEEE 60th Vehicular Technology Conference, 2004, vols. 1-7, pp. 3025-3029.

Ma et al., "Modeling SCTP Throughput in Integrated WLAN/Cellular Networks", 2005 IEEE International Conference on Communications, Seoul, Korea, May 16, 2005, pp. 3445-3449.

Liu et al., "Sub-Path Congestion Control for Concurrent Multipath Transfer", IET 2nd International Conference on Wireless, Mobile & Multimedia Networks, Beijing, China, Oct. 12, 2008, pp. 426-429.

Fiore et al., "An Adaptive Transport Protocol for Balanced Multihoming of Real-Time Traffic"; GLOBECOM '05: IEEE Global Telecommunications Conference, vols. 1-6; 2005, pp. 1091-1096.

Iyengar et al., "Concurrent Multipath Transfer Using SCTP Over Independent End-to-End Paths", IEEE-ACM Transactions on Networking, vol. 14, No. 5, Oct. 2006, pp. 951-964.

Argyriou et al., "Using a new protocol to enhance path reliability and realize load balancing in mobile ad hoc networks"; Ad Hoc Networks, vol. 79, May 11, 2004, pp. 1-17.

Fiore et al., "Concurrent multipath communication for real-time traffic", Computer Communications, vol. 30, No. 17, Nov. 2007, pp. 3307-3320.

Iyengar et al., "Concurrent multipath transfer using SCTP Multihoming", 2004 International Symposium on Performance Evaluation on Computer and Telecommunication Systems, San Jose, California, USA, Jul. 25, 2004, pp. 1-17.

Mascolo et al., "Performance Evaluation of Westwood+ TCP congestion control", Performance evaluation, vol. 55, Jan. 2004, pp. 93-11.

Ye et al., "IPCC-SCTP: an enhancement to the standard SCTP to support multi-homing efficiently", Proceedings of the IEEE international Conference on Performance, Computing, and Communications, Phoenix, Arizona, USA, 2004, pp. 523-530.

El Al et al., "Load sharing in stream control transmission protocol", Proceedings of the 7th IASTED International Conference, Internet and Multimedia Systems and Applications, Honolulu, Hawaii, USA, Aug. 13, 2003, pp. 1-6.

* cited by examiner

CONTROL OF PACKET TRANSFER THROUGH A MULTIPATH SESSION COMPRISING A SINGLE CONGESTION WINDOW

This application claims the benefit, under 35 U.S.C. §365 of International Application PCT/EP2011/052377, filed Feb. 17, 2011, which was published in accordance with PCT Article 21 (2) on Aug. 25, 2011 in English and which claims the benefit of European patent application No. 10290087.5, filed Feb. 19, 2010.

FIELD OF THE INVENTION

The invention relates to the field of control of packet transfer through a multipath session and more particularly to such a method handling a single congestion window control for all the paths included in the mutipath session.

BACKGROUND OF THE INVENTION

In recent years, end-users have increasingly become equipped with devices having a plurality of network interfaces. These interfaces use different technologies to access the Internet such as cellular networks or fixed access networks as well as wired or wireless local access networks. These technologies exhibit different quality characteristics in terms of coverage, capacity, power consumption, geographical availability and cost. At the same time, as more and more data intensive applications find their way onto the Internet, the demand for high data transfer rates is constantly rising. Thus, bandwidth management has become a critical issue.

Current Internet protocols, and in particular TCP/IP, were designed to avoid wasting precious resources and process all packets equally such that when a link is congested, packets are simply lost. Increasing network capacity is often not the right solution for solving the increasing needs of voluminous data transfers and multimedia applications. To improve the quality of service (QoS) of current networks, it is widely agreed that using more than two interfaces concurrently would generally increase the available bandwidth. But in many cases, a single interface might not be able to fulfill all the traffic requirements on its own. Concurrent multipath transfer can improve reliability for real time applications since data is divided and transferred over multiple paths and when a problem occurs on one path the other paths are not affected and the session is maintained alive.

Researchers address the problem of concurrently using multiple network interfaces from a number of different angles. Several multipath approaches have been proposed in all layers of the TCP/IP stack: physical, link, network, transport and application. Lower layer techniques allow more efficient use of a particular link type and present a generic solution for all upper layer protocols and applications. On the other hand, solutions on the upper layers are more tuned to the need for a specific application. A trivial approach consists of the application opening several parallel TCP connections and this approach enables load balancing on the same physical interface. Application layer multipath transmission introduces implementation difficulty by requiring application specific updates. The latest generation exploits the transport layer with solutions such as multipath TCP or SCTP (acronym for "Stream Control Transport Protocol") with its' native multi-homing capability. The transport layer is the best level to manage concurrent multipath since it has precise knowledge about end-to-end network paths.

The Stream Control Transmission Protocol (SCTP) was designed from scratch to overcome some of TCP's limitations such as vulnerability to SYN attack, head-of-line blocking, and absence of support for multihoming. SCTP is a connection oriented protocol which provides reliable transport service messages for application users. An SCTP connection is called an association and an association contains multiple streams (multistreaming). Multihoming is an essential property of SCTP allowing an association to incorporate several source and destination addresses. Each node can be accessed by several addresses.

Multihoming is an essential feature of SCTP allowing an association to be associated with several source and destination addresses. Each node can be accessed by several addresses. Currently, standard SCTP uses the multihoming feature only for retransmission and fail over; other application of multihoming such as load balancing are not supported. There have been several works on load-balancing over the multiple paths in SCTP, exploiting simultaneous utilization of more than one of the available interfaces.

El Al et al, "Load Sharing in Stream Control Transmission Protocol", Proceeding of the Internet and Multimedia Systems and Applications, 2003." suggest the extension of SCTP for load-sharing, the main idea being to create a per-path data-unit sequence number that transforms the per-association SCTP congestion control to a per-path congestion control. However, this involves changes in the SCTP packet format, and updates at both the sender and the receiver.

Iyenger et al, "Concurrent Multipath Transfer Using SCTP Multi-homing", Tech Report 2004-02, CISC Dept, Univ of Delaware, 2003 discuss Concurrent Multi-path Transfer (CMT) in SCTP. Researchers on Concurrent Multipath Transfer agree on the need for structural modifications to congestion control, acknowledgement processing and retransmission mechanisms for independence among the different paths.

Ye et al. in "IPCC-SCTP: an enhancement to the standard SCTP to support multi-homing efficiently", in: Proceedings of the IEEE International Conference on Performance, Computing, and Communications (ICPCC 2004), Phoenix, Ariz., USA, 2004, pp. 523-530 IPCC-SCTP proposed changes to standard SCTP in order to further benefit from multipath features. These changes consist of decoupling the TSN (Transmission Sequence Number) from the congestion control mechanism by introducing a new virtual sequence number called the Path Sequence Number (PSN) for congestion control on each path.

Westwood SCTP with Partial Reliability (W-SCTP-PR) as introduced by Fiore, in "Concurrent multipath communication for real-time traffic", Computer Communications, v.30 n.17, p. 3307-3320, November, 2007 is based on the SCTP-PR extension. IPCC-SCTP and the congestion control of TCP Westwood and also Mascolo et al in "Performance evaluation of Westwood+TCP congestion control, Performance Evaluation 4" (55) (2004) 93-111.

Based on a per-path congestion control algorithm, W-SCTP-PR introduces a per-path cumulative TSN Ack point and updates it after processing a meaningful SACK. W-SCTP-PR also provides a scheduling algorithm, based on the Westwood bandwidth-estimation technique described by Mascolo et al, to estimate the available bandwidth over each path in the association. Bandwidth estimation is made by considering the time between sending data and receiving the corresponding acknowledgment through the same path over which the data was sent. This modifies standard SCTP behavior which delays SACK and may acknowledge through another path than that over which the data was received.

Previous change made to SCTP to support using several paths to send data focuses on the fact of separating congestion control for each path to control paths independently. This split the multipath association to independent per-path associations. Little attention has been paid to using a global congestion control over the multiple paths.

One wishes to modify SCTP to support the multipath while maintaining only one congestion control window for the whole association that controls multiple paths at the same time. Using one congestion control window would allow better controlling the sending rate over the whole association.

Today, multipath protocols are transport layer protocols as multipath TCP or SCTP (Simple Control Transport Protocol). These protocols have a "per path" TCP like congestion control that has the following drawback: when a path slows down, its congestion window decreases (typically divided by 2) and the path cannot contribute efficiently to the multipath transmission until it recovers its full window. Therefore overall transmission does not fully operate the multipath capability.

Most of the multipath work is based on having one TCP like congestion control mechanism per path. Westwood SCTP_PR algorithm provides a load balancing technique that computes, for each path, the bandwidth estimate (a la Westwood) and an estimated reception time based on the bandwidth estimate and path congestion control related information. The scheduler always gives its preference to the path having the smallest computed reception time.

One of the goals of the present invention is to propose to operate a unique congestion window for all the communication paths involved in the multipath session. In addition, the proposed solution computes, for each path, in function of the measured RTT (Round Trip Time) a ratio of total data to be sent to this path.

As exposed above, until now little attention has been paid to using a global congestion control for all the paths of an association. One of the goals of the present invention is to propose a multipath mechanism which can be concurrent while maintaining a single congestion control window that controls multiple paths for the whole association at the same time.

SUMMARY OF THE INVENTION

The invention proposes a new mechanism of packet transport over an association of N paths which does not apply congestion control for each path separately but rather perform a unified congestion control to transmit packet over different paths concurrently and to control the overall sending rate. A load distribution algorithm is used to compute the load ratio for each path with reference to its capabilities. In order to guarantee the determined load distribution we propose a packet scheduling algorithm. The main idea of packet scheduling is to achieve, as closely as possible, optimal load allocation at any time.

Thus, the present invention concerns according to a first aspect, a for controlling a packet transfer through a multipath session comprising a number of n paths P1, ..., Pi, ..., Pn linking a first endpoint E1 to a second endpoint E2, n being an integer greater or equal to 2, i being an integer and $1 \leq i \leq n$, each path Pi being defined by a couple of addresses A1$i$, B1$i$ of a communication interface of said first and second endpoint E1, E2, the first endpoint E1 being configured for sending the packet to said second endpoint E2 through anyone of the paths P1, ..., Pi, ..., Pn, the second endpoint E1 being configured for sending an acknowledgment message ACK through anyone of the paths P1, ..., Pi, ..., Pn when said second endpoint E2 received a packet.

According to an embodiment, it involves, at said first endpoint E1 at a time t, steps of:
S1 assessing a load distribution L<i, t> through the path Pi based on evaluations of a round-trip-time RTT<i, t> over said path Pi for every i between 1 and n;
S2 evaluating a current available load distribution R<i, t> from said data load distribution L<i, t>, from an aggregated size of packets D<i,t> outstanding on said path Pi for every i between 1 and N, and from the aggregated size of packets D<t> outstanding on said paths P1, ..., Pi, ..., Pn;
S3 selecting a path Pi among the paths P1, ..., Pi, ..., Pn from said current available load distribution R<i, t>;
S4 sending said packet on said selected path Pi such that the aggregated size of packets D<t> outstanding on said paths P1, ..., Pi, ..., Pn is lower than a congestion window cwnd whose value is evaluated globally by said first endpoint E1 for said multipath session.

Thus, the present invention concerns according to a second aspect, a device for controlling a transfer of a packet through a multipath session comprising a number of n paths P1, ..., Pi, ..., Pn linking a first endpoint E1 to a second endpoint E2, n being an integer greater or equal to 2, i being an integer and $1 \leq i \leq n$, each path Pi being defined by a couple of addresses A1$i$, B1$i$ of a communication interface of said first and second endpoint E1, E2, the first endpoint E1 being configured for sending the packet to said second endpoint E2 through anyone of the paths P1, ..., Pi, ..., Pn, the second endpoint E1 being configured for sending an acknowledgment message ACK through anyone of the paths P1, ..., Pi, ..., Pn when said second endpoint E2 received a packet, According to an embodiment, said device comprises:
Means M1 for assessing a load distribution L<i, t> through the path Pi based on evaluations of a round-trip-time RTT<i, t> over said path Pi for every i between 1 and n;
Means M2 for evaluating a current available load distribution R<i, t> from said data load distribution L<i, t>, from an aggregated size of packets D<i,t> outstanding on said path Pi for every i between 1 and N, and from the aggregated size of packets D<t> outstanding on said paths P1, ..., Pi, ..., Pn;
Means M3 for selecting a path Pi among the paths P1, ..., Pi, ..., Pn from said current available load distribution R<i, t>;
Means M4 for evaluating a value of congestion window cwnd globally by said device for said multipath session;
Means M5 for sending said packet through said selected path Pi such that the aggregated size of packets D<t> outstanding on said paths P1, ..., Pi, ..., Pn is kept lower than the congestion window value cwnd.

The use of a single congestion control window for all the paths of the association allows better control of the sending rate over the whole association because, in the case where several paths have different transmission characteristics, fast paths may have to wait for slow path acknowledgments to transmit new packet.

BRIEF DESCRIPTION OF THE DRAWINGS

The invention will be better understood and illustrated by means of the following embodiments and execution examples, in no way limitative, with reference to the appended figure on which.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

Figure 1:
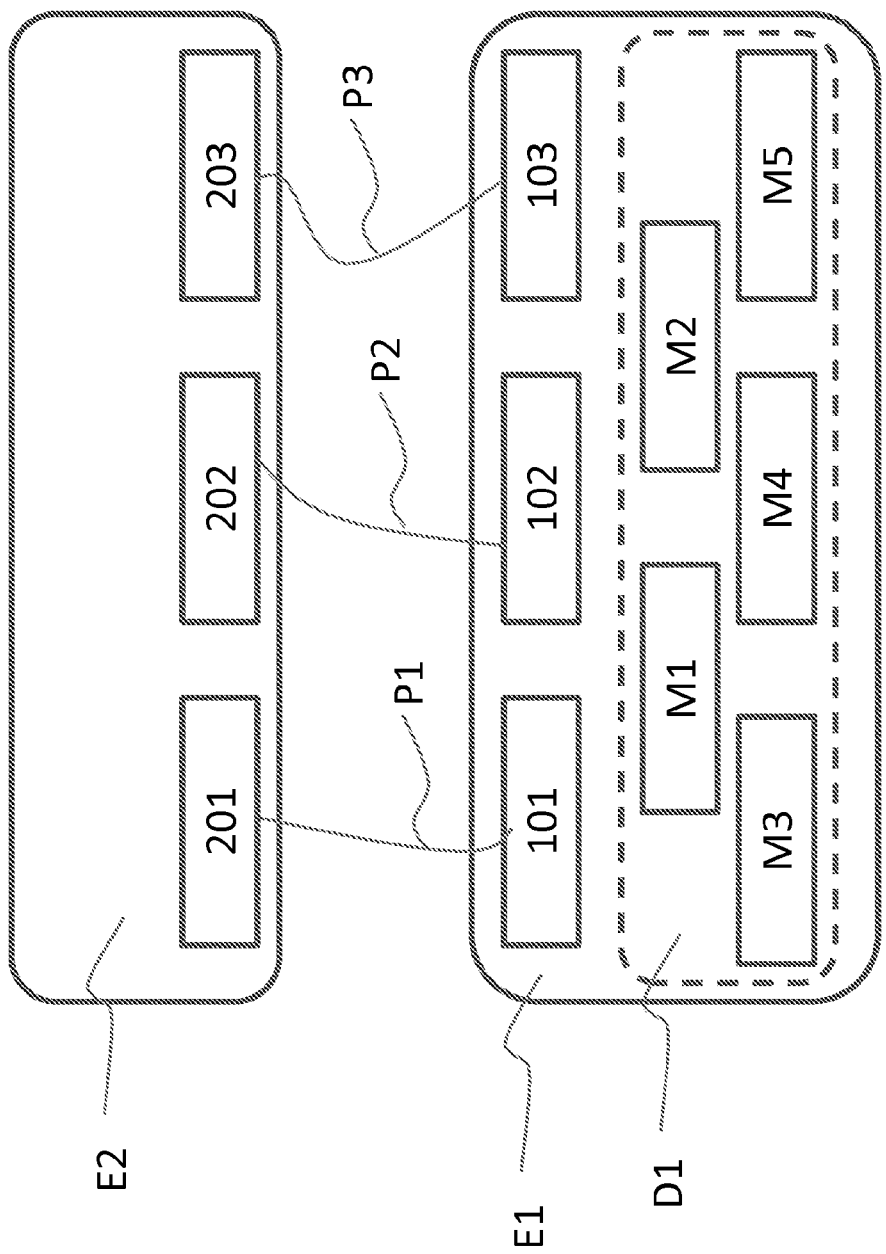
FIG. 1, illustrates the topology of a multipath association linking a first and a second endpoint.

FIG. 1 shows a first endpoint E1 and a second endpoint E2 linked by three paths P1, P2, and P3. Each path is defined by an address 101, 102, 103 of a communication interface of said first endpoint E1 and an address 201, 202, 203 of a communication interface of said second endpoint E2. On FIG. 1, the communications interfaces of said endpoints E1, E2 are represented as independent boxes signaled by their address 101, 102, 103, 201, 202, 203.

The first endpoint E1 further comprises at least five means M1, M2, M3, M4, M5 gatherer in a device D1. Those five means are configured for performing 4 steps of the method according to an embodiment. The operations they carry out will be explained below. The means M1, M2, M3, M4, M5 can be realized by software, hardware or combination of software and hardware.

Advantageously, the device D1 is located in the first endpoint E1.

A transport protocol is used for transporting data from the first endpoint E1 to the second endpoint E2 by said path P1, P2 and P3. The described embodiment is linked with multipath delivery protocol. SCTP will be taken below as an exemplary illustration but it is understood that the invention is not limited to this particular protocol.

The basic service offered by SCTP is a reliable transfer of messages between SCTP users named endpoints. It performs this service within the context of an association between two SCTP endpoints. One wishes to send from said first endpoint E1 to said second endpoint E2 a plurality of packets and to take benefit of the global bandwidth aggregated by the paths linking said endpoints E1, E2.

As a general preambles, one recalls that in the field of computer networking, the maximum transmission unit (later named MTU) of a communications protocol of a layer is the size (e.g. in bytes) of the largest protocol data unit that the layer can pass onwards.

One also recalls that in the same field, the Round Trip Time (RTT) is the time duration elapsed between sending a packet by the first endpoint E1 (sender) and receiving by said first endpoint E1 an acknowledgment for acknowledging packet reception from the second endpoint E2 (destination of the packet). RTT reflects the bitrate of links along the path, the propagation delay, and packet queuing delay. In other word RTT combines path features and can be used to compare path capacities.

SCTP uses an end-to-end window based flow and a congestion control mechanism similar to the one that is well known from TCP (cf. http://www.rfc-editor.org/rfc/pdfrfc/rfc2581.txt.pdf). The congestion window (cwnd) is a sender-side limit on the amount of data the sender can transmit into the network before receiving an acknowledgment (ACK), while a receiver's advertised window (rwnd) is a receiver-side limit on the amount of outstanding data. In other words, cwnd is a variable that limits the amount of data, in number of bytes, a sender can send to a to particular destination transport address before receiving an acknowledgement.

In case the protocol used for transporting data packets from the first endpoint to the second endpoint is SCTP, one knows from the paragraph 3.3.1 of the technical document "RFC 4960—Stream Control Transmission Protocol" which can be found on the internet at the following address "http://tools.ietf.org/html/rfc4960" the payload structure of a SCTP data chunk (or SCTP data packet).

In SCTP, detection of loss and duplication of packets is enabled by numbering all packets in the sender with the so-called Transport Sequence Number (TSN). The acknowledgements sent from the receiver to the sender are based on these sequence numbers. Retransmissions are timer-controlled. The timer duration is derived from continuous measurements of the round-trip-time (RTT). Whenever such a retransmission timer expires, (and congestion control allows transmissions) all non-acknowledged packets are retransmitted and the timer is started again doubling its initial duration (like in TCP).

When the receiver detects one or more gaps in the sequence of packets, each received SCTP packet is acknowledged by sending a SACK packet which reports all gaps. Whenever the sender receives four consecutive SACK packets reporting the same data packet missing, this packet is immediately retransmitted (so called "fast retransmit"). The sender must wait for the acknowledgement of the packet already sent before transmitting again.

Traffic is distributed with reference to the path capabilities, as reported in a first paragraph below entitled "Load Distribution". In order to guarantee the load distribution one proposes a packet distribution algorithm in second paragraph below entitled "Packet Scheduling". The main idea of packet distribution is to achieve, as closely as possible, optimal load allocation at any time.

Load Distribution

In method according to the embodiment, the first endpoint E1 (as sender) computes the optimal sending load for each path based on its estimated RTT. The algorithm involves monitoring RTT on each path. The RTT estimation is performed periodically at a fixed time interval T, where T depends on the paths changing frequency. If the path features change rapidly, then the RTT estimation must be performed at a similar frequency.

Let N be the total number of active paths of the association and $RTT(i,t)$ and $L(i, t)$ be the estimated RTT and load sending rates, respectively for path P, over a time interval $((t-1).T, tT)$. The load sending rate $L(i, t)$ reflects the percentage of data to be sent on path Pi with respect to the total data to be sent on the whole association. The goal is to determine the vector:

$$L(t)=(L(1,t), \ldots, L(N,t)) \quad (1)$$

The weight of a path Pi compared to all the paths is given by:

$$W(i, t) = \frac{\alpha_i \cdot RTT(i, t)}{\sum_{j=1}^{N} \alpha_j \cdot RTT(j, t)} \qquad (2)$$

The load distribution based on the RTT estimation is given by:

$$L(i, t) = \frac{1 - W(i, t)}{N - 1} \qquad (3)$$

where, $\alpha_i=2$ if during $((t-2).T, (t-1).T)$ congestion occurred on path Pi and $\alpha_i=1$ when no congestion occurred.

Equation (2) verifies that: $\Sigma_{i=1}^{N} L(i,t)=1$

One periodically computes the load distribution at interval T; the load distribution is constant during the time interval T except if an update of the load distribution is requested. The load allocation algorithm provides a reasonable way of distributing traffic in order to reduce packet reordering.

In the next section, one describes the packet distribution algorithm in order to apply the load distribution in the best way.

Packet Scheduling

After determining the load distribution, the problem is to select the path for sending each packet, while respecting the load allocated to each path. The idea the invention is to follow as closely as possible the load distribution.

Sending a packet on a path may cause a temporary imbalance in the load distribution causing some paths to exceed their load, i.e. to be asked to send more data than expected, while others may have less. Those paths that exceeded their load will be requested less in the future. Thus, knowledge of the current level of load distribution is necessary for the packet distribution.

To measure the deviation of actual traffic distribution from the expected load distribution, a new metric is introduced to quantify the underutilization of the path. One measures the residual load of each path Pi just before distributing a packet in the time interval $((t-1).T, tT)$. $R(i,t)$ is defined as the traffic load to inject on path before the next period in order to achieve the expected load. $R(i,t)$ is calculated as follows:

$$R(i, t) = L(i, t) - \frac{D(i, t)}{D(t)} \qquad (4)$$

where $D(i,t)$ and $D(t)$ are respectively an aggregated size of packets (D<i,t>) outstanding on said path (Pi the aggregated size of packets (D<t>) outstanding on said paths (P1, . . . , Pi, . . . , Pn) at instant t since the last load distribution assignment. One uses $R(i,t)$ to measure the traffic under load on Pi just before distributing a packet.

If $R(I,t)>0$, path $P_i$ has been injected with less traffic than expected and a packet can be sent on this path.

On the other hand, if $R(i,t)<0$, there is too much traffic being assigned to it and a packet should not be transmitted on this path. To summarize, $R(i,t)$ provides an indicator to the packet distributor for deciding which path a packet should be transmitted on. The packet scheduling algorithm according to the embodiment picks the least satisfied path which corresponds to the path with the maximum residual traffic load.

The packet distribution algorithm according to the embodiment is based on the sending of a packet over a path $P_i$ such that $R(i,t)$ is maximized. Therefore one tries to satisfy the path that has been injected with the least traffic with respect to the load distribution:

$$R(i,t)=\text{Max}(R(j,t)), j=\{1, \ldots, N\} \qquad (5)$$

Packet Sending

Once a path is selected, one has to conform to the control of the congestion window. That means that, like in TCP a packet sending is performed on the selected path immediately when the aggregated size of packets D<t> outstanding on said paths P1, . . . , Pi, . . . , Pn is lower than a congestion window cwnd.

If it is not the case, the packet sending is delayed until this condition is fulfilled.

Figure 2:
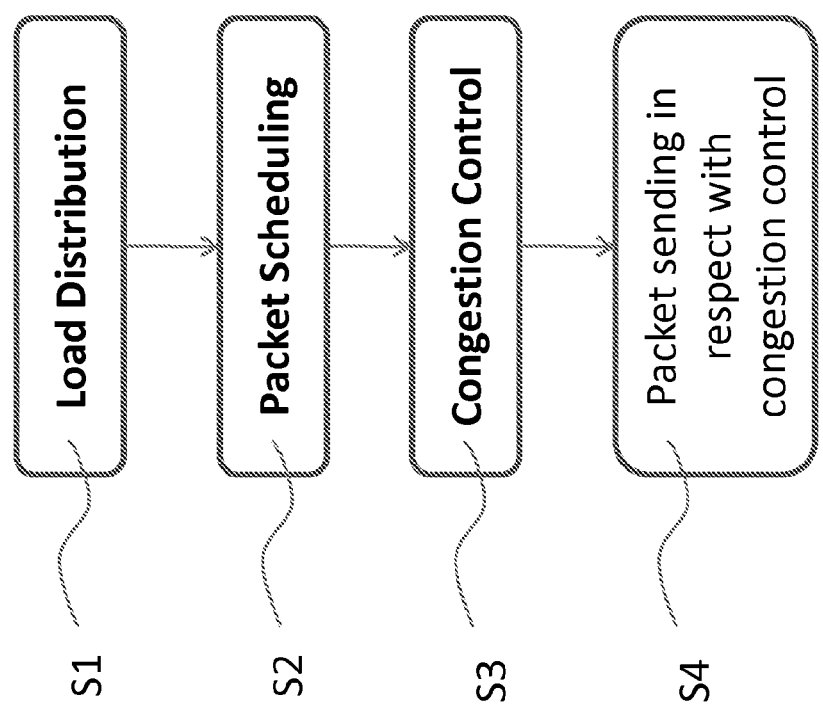
FIG. 2, shows a flow chart of the method according to the embodiment.

The FIG. 2 summarizes the four main steps of the method according to the embodiment which are performed at said first endpoint (E1), at a time t:

The method involves the steps of:

S1 assessing a load distribution L<i, t> through the path Pi based on evaluations of a round-trip-time RTT<i, t> over said path Pi for every i between 1 and n;

S2 evaluating a current available load distribution R<i, t> from said data load distribution L<i, t>, from an aggregated size of packets D<i,t> outstanding on said path Pi for every i between 1 and N, and from the aggregated size of packets D<t> outstanding on said paths P1, . . . , Pi, . . . , Pn;

S3 selecting a path Pi among the paths P1, . . . , Pi, . . . , Pn from said current available load distribution R<i, t>;

S4 sending said packet on said selected path Pi such that the aggregated size of packets D<t> outstanding on said paths P1, . . . , Pi, . . . , Pn is lower than a congestion window cwnd whose value is evaluated globally by said first endpoint E1 for said multipath session.

Those various steps are carried out by the means M1, M2, M3, M4, M5 comprised in the device D1 represented in FIG. 1.

Congestion Control

Generally transport protocols adopt congestion control from TCP, including Slow-Start, Congestion Avoidance, and Fast Retransmission mechanisms. The transport sender starts data transmission with unknown conditions. In the slow start phase it probes the network to determine the available capacity. Thus, at the beginning the congestion window is set to 2*MTU.

Advantageously, the congestion windows value cwnd is set to 2.N.MTU before said first endpoint E1 sent any packet to said second endpoint E2.

During slow start the congestion window increases by the amount of data acknowledged by the reception of a SACK packet. When the congestion window exceeds the slow-start threshold or detects packet loss, the congestion avoidance phase begins. During congestion avoidance the congestion window increases by one MTU every RTT. The fast retransmission mechanism is triggered when the sender (endpoint E1) receives four duplicated SACKs. The sender concludes that there is a packet loss and immediately sends the lost packet.

According to an embodiment, one introduces a single congestion control window to control the overall association sending rate. The SWCM global congestion control window is shared between different paths simultaneously based on the load distribution on each path. This allows load balance between the different paths.

Figure 3:
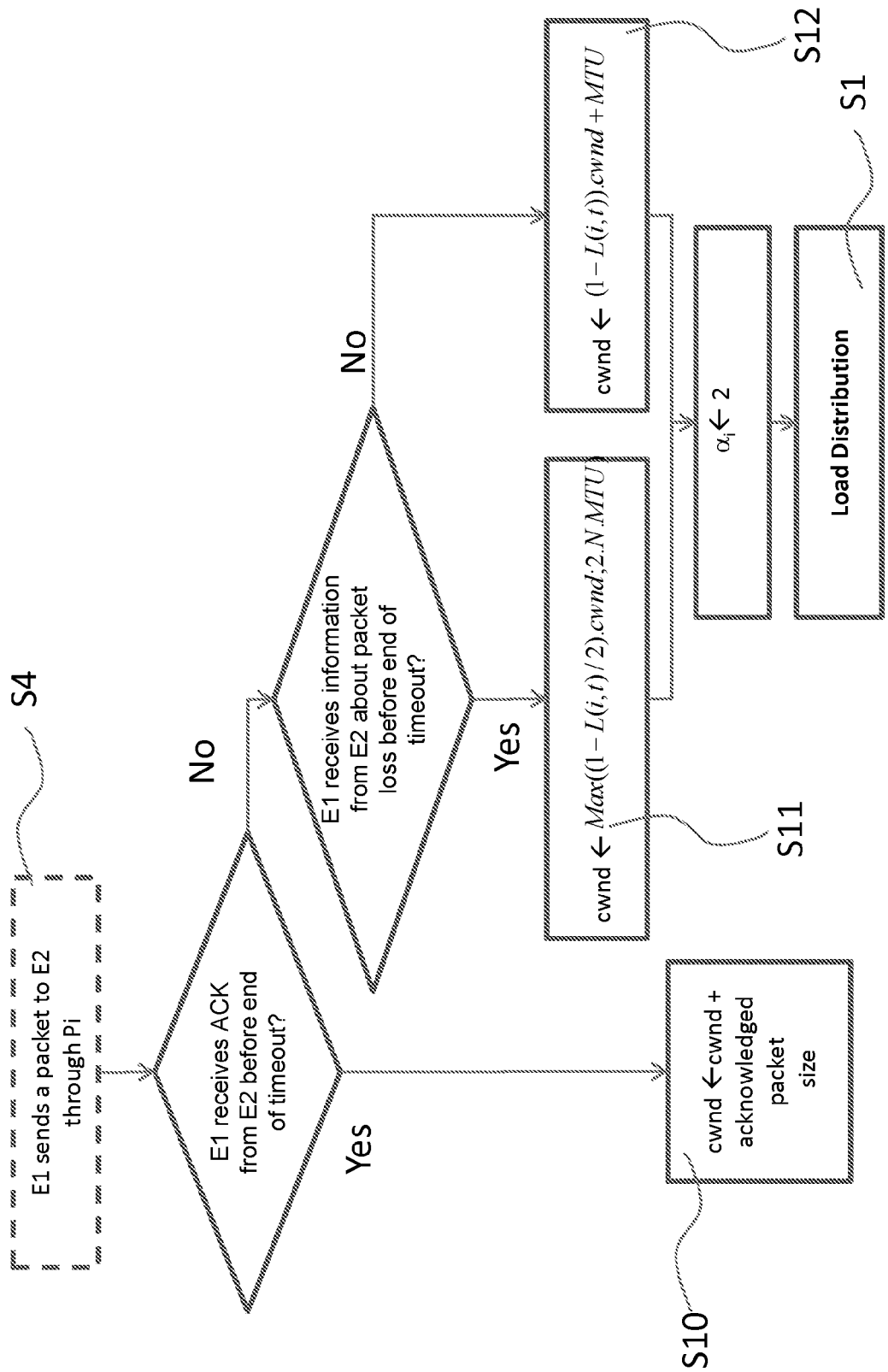
FIG. 3 shows a flow chart of a step of evaluating a congestion window according to the embodiment.

FIG. 3, introduces the congestion control algorithm according to the embodiment.

Initially the congestion window is set to cwnd=N*2*MTU, where N is the number of active paths in the association. The slow-start case is quite similar to the standard SCTP slow-start. The congestion window is increased with the size of packet acknowledged by an incoming SACK (Step 10).

Advantageously, the method according to an embodiment further involves a step of evaluating the value of congestion window when said second endpoint (E2) informs said first endpoint (E1) of a reception of a packet before the end of a timeout duration starting when said packet is sent from said first endpoint (E1) through said path (Pi), wherein said evaluation consists in additively increasing the congestion window value by the size of the packet.

Standard SCTP increases cwnd only if an incoming SACK updates the cumulative TSN Ack point. In the concurrent multipath case SACKs may not change the cumulative TSN Ack point and at the same time acknowledge packets that were received out of order. The solution to this problem is to separate the increasing of the congestion window from the cumulative TSN Ack point. When a SACK is received the sender verifies if it acknowledges packets that are received out of order. Those packets are acknowledged by the gap reports, the sender compare with packets pending for acknowledgment and increase cwnd by the amount of data acknowledged.

The essential reason for the fast retransmission problem is that the standard SCTP fast retransmission happens when receiving 4 duplicated SACKs. The sender does not wait for retransmission timeout to send a lost packet back, which results in congestion and reduction of the congestion window.

Sending data over multiple paths with different characteristics may introduce out of order delivery leading to unnecessary retransmission and congestion events. A solution to this problem is given in IPCC-SCTP by Ye et al. Duplicate SACKs are taken into account only if the received SACK containing a gap report acknowledges for the first time a chunk that was sent over the same path as the missing chunk and with a TSN higher than the missing packet. When four trusted duplicate SACKs are received on a path a fast retransmission occurs. The overall congestion window is not halved, but only the load sharing of that particular path is reduced to the half. The overall congestion window is reduced to (Cf. step 11):

$$cwnd = \text{Max}\left(\left(1 - \frac{L(i, t)}{2}\right) \cdot cwnd; 2 \cdot N \cdot MTU\right) \quad (6)$$

where L(i,t) is the load allocation ratio of path Pi, through which the packet to retransmit was sent through for the first time. The load distribution ratio is also halved, like TCP does when congestion occurs, by setting $\alpha_i$=2. Retransmission is triggered when a TCP like RTO timer expires.

Using this congestion control mechanism, one intends to reduce the influence of a congested path on the association; the congestion window size cwnd is kept to a certain value that guarantees a high total transmission throughput. Only the sending rate over the congested path is halved.

Advantageously, the step of evaluating the congestion window cwnd is carried out when the second endpoint E2 informs the first endpoint E1 of a non-arrival of the packet before the end of the timeout duration, wherein said evaluation consists in assigning to the congestion window a value equal to the largest value between of $$\left(1 - \frac{L(i, t)}{2}\right) \cdot cwnd$$

and 2.N.MTU where MTU is the path maximum transmit unit of said association. (cf. step S11 in FIG. 3)

Advantageously, the step of evaluating the congestion window (cwnd) is further carried out when none information is received by the first endpoint (E1) from said second endpoint (E2) about the reception of the packet by said second endpoint (E2) before the end of the timeout duration, wherein said evaluation consists in assigning to the congestion window a value equal to MTU+L(i,t).cwnd. (cf. step S12 in FIG. 3)

Therefore sending acknowledgments as rapidly as possible can speed up the sender and enable a higher sending rate. Standard approaches delay SACKs and send them over the last path through which data was received, which slows down the association when paths have heterogeneous characteristics. Our solution is to send SACKs over the fastest path which the receiver computes from all available paths by means of the heartbeat mechanism. The criteria we used to decide which path to choose is the RTT though, of course, other factors could be taken into consideration.

The goal behind the use of a single congestion window for all the paths is to enable the association to follow the paths with higher capacities while using the others to increase the sending data speed. Therefore sending acknowledgments as rapidly as possible can speed up the sender and enable a higher sending rate. The original SCTP delays SACKs and sends them over the last path through which data was received, which slows down the association when paths have heterogeneous characteristics. The method according to the embodiment consists further in sending SACKs over the fastest path which the endpoint 2 computes from all available paths by means for example of the HEARTBEAT mechanism (in case SCTP). The criteria one used to decide which path to choose is the RTT though, of course, other factors could be taken into consideration.

The invention claimed is:

1. A method for controlling a packet transfer, the method comprising:
    establishing, by a first endpoint, a multipath session comprising a plurality of paths linking the first endpoint to a remote second endpoint;
    associating, by the first endpoint, each path in the multipath session with a pair of addresses, each address in the pair corresponding to a respective communication interface of said first and second endpoint;
    sending, by the first endpoint, a packet to said second endpoint through a given path of the multipath session;
    assessing, by the first endpoint, a load distribution through the given path based on evaluations of a round-trip-time over each path of the plurality of paths;
    evaluating, by the first endpoint, a current available load distribution of the plurality of paths based at least partially on said load distribution, an aggregated size of packets outstanding on each path of the plurality of paths, and the aggregated size of packets outstanding on the plurality of paths;

selecting, by the first endpoint, said given path among the plurality of paths based at least partially on said current available load distribution; and sending, by the first endpoint, said packet on said given path such that the aggregated size of packets outstanding on the plurality of paths is lower than a congestion window indicative of a limit on an amount of data allowed to be transmitted without receiving an acknowledgement, a single value of the congestion window being evaluated based on a combination of individual values of every path in the plurality of paths by said first endpoint, wherein said individual values are based at least in part on the round-trip-time.

2. The method according to claim 1, further comprising evaluating, by the first endpoint, the value of the congestion window, when said first endpoint detects reception of a packet by the second endpoint before expiration of a timeout duration, the timeout duration starting when said packet is sent from said first endpoint through said path; and increasing, by the first endpoint, the congestion window value by a size of the packet.

3. The method according to claim 2, wherein evaluating the congestion window further comprises:

evaluating, by the first endpoint, the congestion window when an indication that a packet arrived at the second endpoint is detected before expiration of the timeout duration; and setting, by the first endpoint, the value of the congestion window to a largest value between $$\left(1 - \frac{L(i, t)}{2}\right) \cdot cwnd$$

and 2.N.MTU where MTU is the path maximum transmit unit of an association, cwnd is the congestion window, L(i,t) is the load distribution, and N is a number of paths in the plurality of paths.

4. The method according to claim 3, wherein evaluating the congestion window further comprises:

evaluating, by the first endpoint, the congestion window when no indication that the packet was received by the second endpoint is detected before expiration of the timeout duration; and setting, by the first endpoint, the value of the congestion window to MTU+L(i,t).cwnd.

5. The method according to claim 4, further comprising:

assessing, by the first endpoint, a load distribution; and evaluating, by the first endpoint, a current available load distribution, when no indication that the second endpoint received the packet is detected before the timeout duration expires.

6. The method according to claim 5, further comprising setting, by the first endpoint, the value of the congestion window cwnd to 2.N.MTU before sending any packet to said second endpoint.

7. An endpoint device comprising:

a communication interface;

at least one processor configured to:

establish, using the communication interface, a multipath session comprising a plurality of paths linking the endpoint to a remote endpoint;

associate each path in the multipath session with a pair of addresses, each address in the pair corresponding to a respective communication interface of the endpoint and the remote endpoint;

send, using the communication interface, a packet to the remote endpoint through a given path of the multipath session;

assess a load distribution through the given path based on evaluations of a round-trip-time over each path of the plurality of paths;

evaluate a current available load distribution of the plurality of paths based at least partially on said load distribution, an aggregated size of packets outstanding on each path of the plurality of paths, and the aggregated size of packets outstanding on the plurality of paths;

select said given path among the plurality of paths based at least partially on said current available load distribution; and send, using the communication interface, said packet on said given path such that the aggregated size of packets outstanding on the plurality of paths is lower than a congestion window indicative of a limit on an amount of data allowed to be transmitted without receiving an acknowledgement, a single value of the congestion window being evaluated based on a combination of individual values of every path in the plurality of paths, wherein said individual values are based at least in part on the round-trip-time.

8. The endpoint device according to claim 7, wherein the at least one processor is further configured to:

evaluate the value of the congestion window, when reception of a packet by the remote endpoint is identified before expiration of a timeout duration, the timeout duration starting when said packet is sent through said path; and increase the congestion window value by a size of the packet.

9. The endpoint device according to claim 8, wherein the at least one processor is further configured to:

evaluate the congestion window when an indication that a packet arrived at the remote endpoint is detected before expiration of the timeout duration; and set the value of the congestion window to a largest value between $$\left(1 - \frac{L(i, t)}{2}\right) \cdot cwnd$$

and 2.N.MTU where MTU is the path maximum transmit unit of an association, cwnd is the congestion window, L(i,t) is the load distribution, and N is a number of paths in the plurality of paths.

10. The endpoint device according to claim 9, wherein the at least one processor is further configured to:

evaluate the congestion window when no indication that the packet was received by the remote endpoint is detected before expiration of the timeout duration; and set the value of the congestion window to MTU+L(i,t) .cwnd.

11. The endpoint device according to claim 10, wherein the at least one processor is further configured to:

assess a load distribution; and evaluate a current available load distribution, when no indication that the remote endpoint received the packet is detected before the timeout duration expires.

12. The endpoint device according to claim 11, wherein the at least one processor is further configured to:

set the value of the congestion window cwnd to 2.N.MTU before sending any packet to the remote endpoint.

\* \* \* \* \*